United States Patent
Faget

(10) Patent No.: US 6,895,420 B1
(45) Date of Patent: May 17, 2005

(54) APPARATUS AND METHOD FOR SHARING DATA FET FOR A FOUR-WAY MULTIPLEXER

(75) Inventor: Roy R Faget, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/505,382

(22) Filed: Feb. 16, 2000

(51) Int. Cl.⁷ .............................................. G06F 15/00
(52) U.S. Cl. ................................ 708/209; 708/200
(58) Field of Search .............................. 708/209, 200, 708/160; 377/69–130

(56) References Cited

U.S. PATENT DOCUMENTS

| | | | | |
|---|---|---|---|---|
| 3,596,251 A | * | 7/1971 | Buchan et al. ................ | 377/69 |
| 3,790,960 A | * | 2/1974 | Amdahl et al. ............. | 708/209 |
| 3,961,750 A | * | 6/1976 | Dao ........................... | 708/209 |
| 4,128,872 A | * | 12/1978 | Prioste ....................... | 377/64 |
| 4,149,263 A | * | 4/1979 | Prioste ....................... | 377/69 |
| 4,636,976 A | * | 1/1987 | Takla .......................... | 377/64 |
| 4,779,220 A | | 10/1988 | Nukiyama | |
| 4,782,457 A | | 11/1988 | Cline | |
| 4,984,189 A | * | 1/1991 | Neki .......................... | 708/209 |
| 5,130,941 A | * | 7/1992 | Kudou ........................ | 708/209 |
| 5,150,389 A | | 9/1992 | Kawasaki | |
| 5,513,362 A | | 4/1996 | Urano et al. | |
| 5,526,296 A | * | 6/1996 | Nakahara et al. ........... | 708/209 |
| 5,553,010 A | * | 9/1996 | Tanihira et al. ............. | 708/209 |
| 5,652,718 A | * | 7/1997 | Thomson et al. ........... | 708/209 |
| 5,706,323 A | | 1/1998 | Miller | |
| 5,793,654 A | | 8/1998 | Doshi et al. | |
| 5,798,952 A | | 8/1998 | Miller, Jr. et al. | |
| 5,822,231 A | * | 10/1998 | Wong et al. ................ | 708/209 |
| 5,859,999 A | | 1/1999 | Morris et al. | |
| 5,860,017 A | | 1/1999 | Sharangpani et al. | |
| 5,961,575 A | * | 10/1999 | Hervin et al. ............... | 708/209 |
| 6,317,763 B1 | * | 11/2001 | Vatinel ....................... | 708/209 |
| 6,324,239 B1 | * | 11/2001 | Potter et al. ................. | 377/64 |
| 6,393,446 B1 | * | 5/2002 | Dhong et al. ............... | 708/209 |

FOREIGN PATENT DOCUMENTS

| | | |
|---|---|---|
| EP | 0173570 | 3/1986 |
| FR | 2673316 | 8/1992 |

OTHER PUBLICATIONS

Search Report issued on Jan. 19, 2004, in counterpart foreign application in FR under application No. 0012427.
IEEE Standard for Binary Floating–Point Arithmetic, ANSI/IEEE Std. 754 (1985).
Wolfe, A., "Patents shed light on Merced's Innards", Electronic Engineering Times, Feb. 15, 1999.

* cited by examiner

*Primary Examiner*—Kakali Chaki
*Assistant Examiner*—Chat Do

(57) ABSTRACT

Data sharing among adjacent logic gates for shifting data in a multiplexer. Each logic gate implements two stages of shifting and provides for data sharing by connecting data inputs among the logic gates. Based upon the data sharing connections, control signals feed bits into each logic gate from adjacent logic gates to perform various shifting operations on a data bus.

16 Claims, 5 Drawing Sheets

APPARATUS AND METHOD FOR SHARING DATA FET FOR A FOUR-WAY MULTIPLEXER

FIELD OF THE INVENTION

The present invention relates to a multiplexer for shifting data.

BACKGROUND OF THE INVENTION

Use of floating point multiply-accumulate (FMAC) operations are known in the art. An FMAC operation involves performing on three operands, A, B, and C, the operation A*B+C. FMAC operations are useful in that they may be used to implement both multiplication and division. For multiplication, the value of operand C is set to zero. For addition, the value of operand A is set to one. FMAC operations typically comply with an industry standard for use of floating point numbers, which are expressed in terms of both a mantissa and an exponent and are further explained in IEEE Standard for Binary Floating-Point Arithmetic, IEEE Std. 754-1985, incorporated herein by reference.

FMAC operations are implemented in multiple stages, and the final stage is used to normalize the value of the mantissa of the result. In particular, according to use of floating point numbers complying with the IEEE standard, the result is shifted to obtain a leading one in the mantissa and thus remove all leading zeros. This produces a normalized result for the FMAC operation. To obtain a leading one in the result, multiplexers are typically used in order to shift the result until the value one resides in the most significant bit position.

Multiplexers are known in the art and use control signals in order to shift input data among output lines based upon the control signals. Multiplexers can require many inputs for the data lines and the control signals, and each data input can require a separate data line and individual transistor for interfacing the data line with a corresponding logic gate that performs the data shifting. Due to the high number of inputs, individual data lines increase the number of transistors required for each gate, thus increasing the area and power consumption of each gate.

Accordingly, a need exists for a multiplexer for data shifting having reduced area and potentially other advantages.

SUMMARY OF THE INVENTION

A logic circuit consistent with the present invention uses data sharing in a multiplexer for shifting data. It includes a plurality of logic gates and a plurality of shared data lines connecting the logic gates. Each logic gate receives data inputs and control signals, and the shared data lines provide a portion of the data inputs for each of the logic gates by connecting data inputs among the plurality of logic gates. In operation, the logic gates shift data received at the data inputs based upon the control signals and the connections of the shared data lines to produce a shifted data output.

A method consistent with the present invention includes sharing data among logic gates in a multiplexer for shifting data. It includes providing a plurality of logic gates each receiving data inputs and control signals, and connecting the logic gates using a plurality of shared data lines. The data lines provide a portion of the data inputs for each of the logic gates by connecting data inputs among the plurality of logic gates. Data received at the data inputs is shifted based upon the control signals and the connections of the shared data lines to produce a shifted data output.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

A multiplexer consistent with the present invention uses data sharing among field-effect transistors (FETs) in order to reduce the number of transistors required by each logic gate. Therefore, instead of using a separate transistor for each input data line to each logic gate, only a single transistor is required in this example for a particular data input. The other data inputs are received from adjacent or other logic gates using shared data lines.

Figure 1:
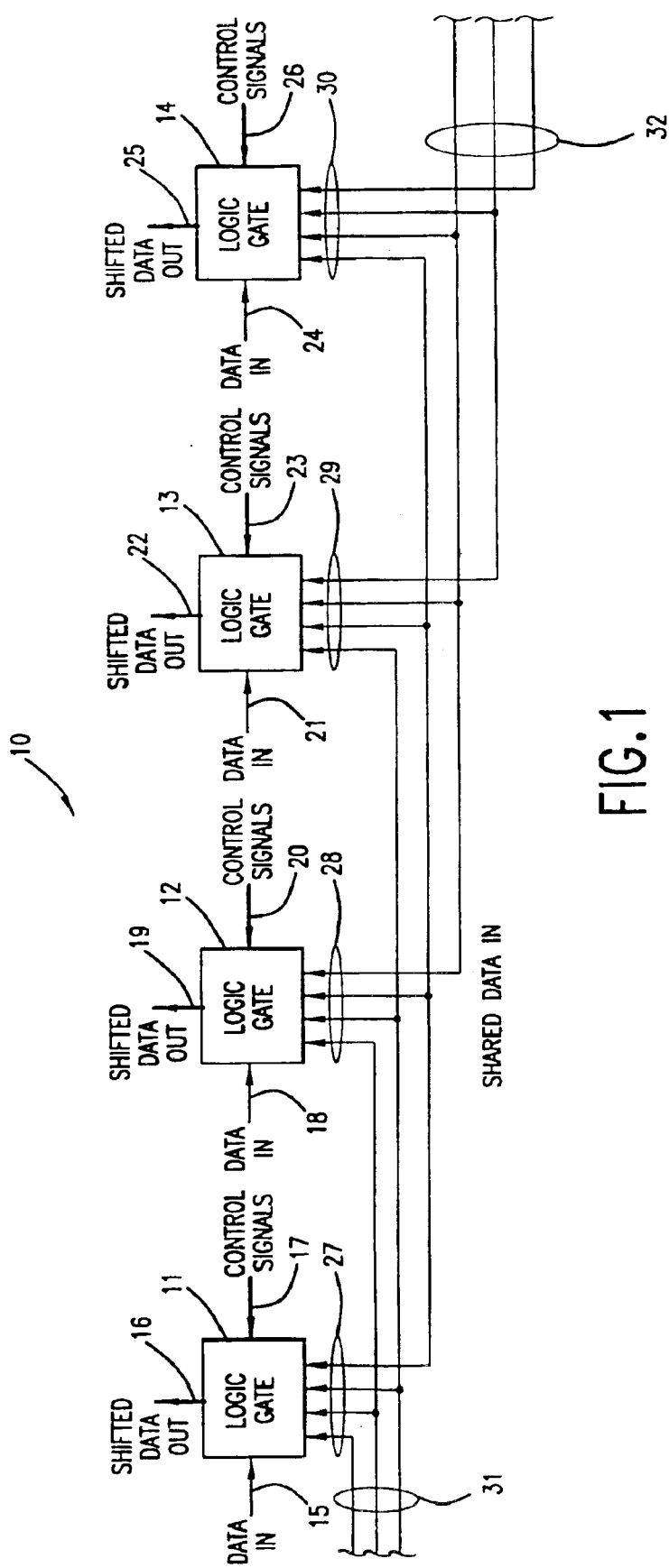
FIG. 1 is a block diagram of a portion of a multiplexer illustrating data sharing consistent with the present invention.

FIG. 1 is a block diagram of a portion 10 of a multiplexer for implementing data sharing consistent with the present invention. This example only illustrates four logic gates among many logic gates that may be required to implement a particular multiplexer depending upon the size of a data bus involved. This example illustrates four logic gates 11, 12, 13, and 14. Each logic gate receives data inputs, and produces shifted data outputs based upon input control signals and how the data is shared among the logic gates as determined by connections of shared data lines.

Logic gate 11 receives a data input 15 and shared data inputs 27, and it produces a shifted data output 16 based upon control signals 17. Logic gate 12 receives a data input 18 and shared data inputs 28, and it produces a shifted data output 19 based upon control signals 20. Logic gate 13 receives a data input 21 and shared data inputs 29, and it produces a shifted data output 22 based upon control signals 23. Logic gate 14 receives a data input 24 and shared data inputs 30, and it produces a shifted data output 25 based upon control signals 26. Logic gates 11–14 also receive a clocking signal, identified below, to enable their operation.

The shifted data output 16, 19, 22, and 25 may include a plurality of data outputs for each logic gale 11–14. For example, this implementation may be used for dual rail Domino CMOS logic, which produces two outputs for each logic gate, a high output and a complementary low output. Other types of logic gates may likewise implement the data sharing in a multiplexer.

Each of the logic gates 11–14 performs processing for one data bit. Additional logic gates may be used depending upon the size of the data bus involved. For example, this implementation may be used for dual rail Domino CMOS logic having a 64-bit data bus. Therefore, additional logic gates similar to gates 11–14 may be used to provide for a 64-bit data bus. The additional logic gates also have data sharing as described below. For example, lines 31 and 32 provide for data sharing among logic gates adjacent gates 11 and 14, as well as other logic gates. That data sharing in this example is implemented in the same manner as data sharing shown among gates 11–14.

The control signals 17, 20, 23, and 26 may include a plurality of control lines to provide for multiple shifting operations. In this example, each logic gate 11–14 implements two stages of shifting. The first shift stage uses four shift control lines to produce four shifting conditions, and the second shift stage uses three shift control lines to produce three shifting conditions, both of which are explained below.

Figure 2A:
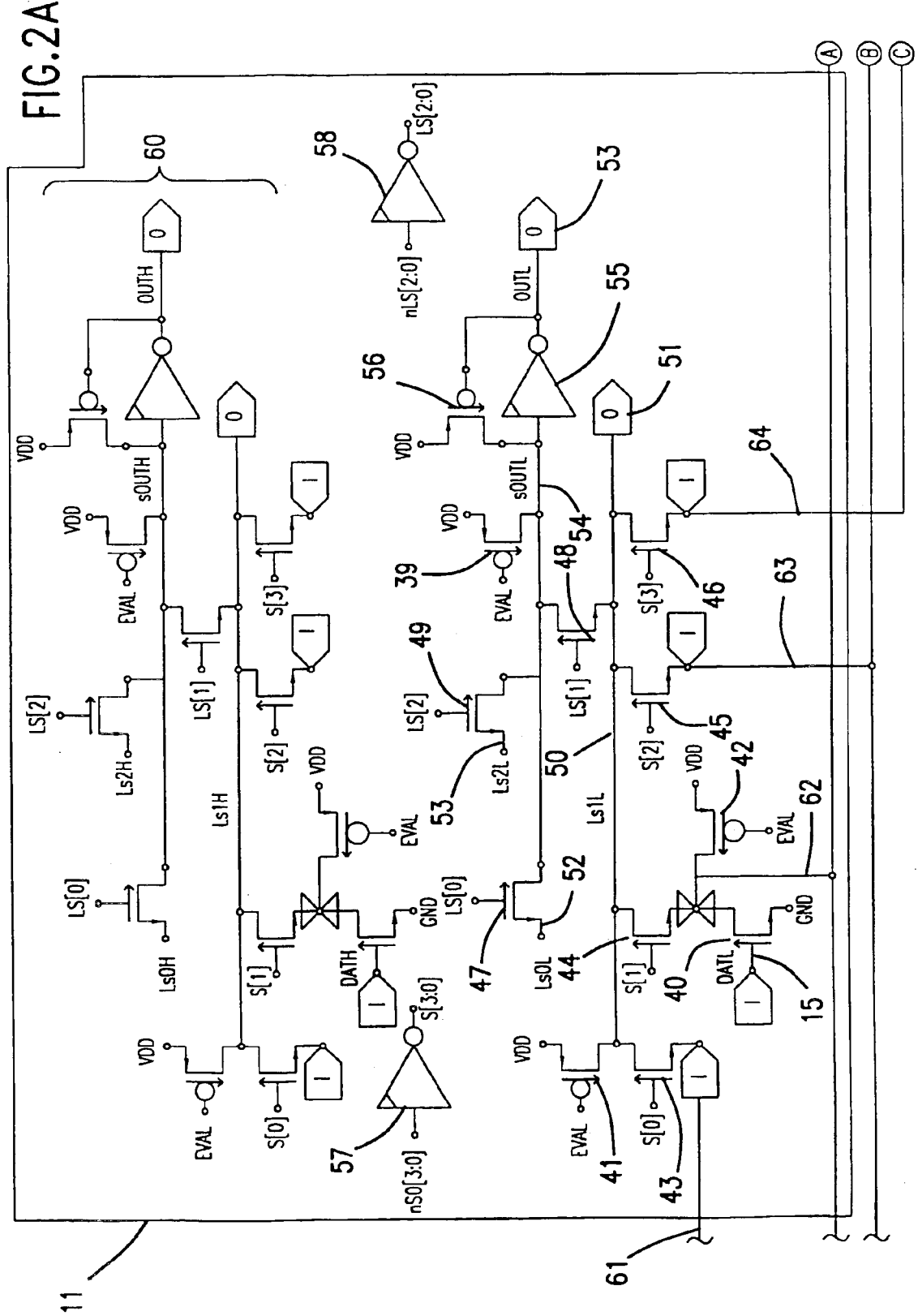
FIGS. 2A–2D are circuit diagrams of logic gates for implementing the data sharing illustrated in FIG. 1.
Figure 2B:
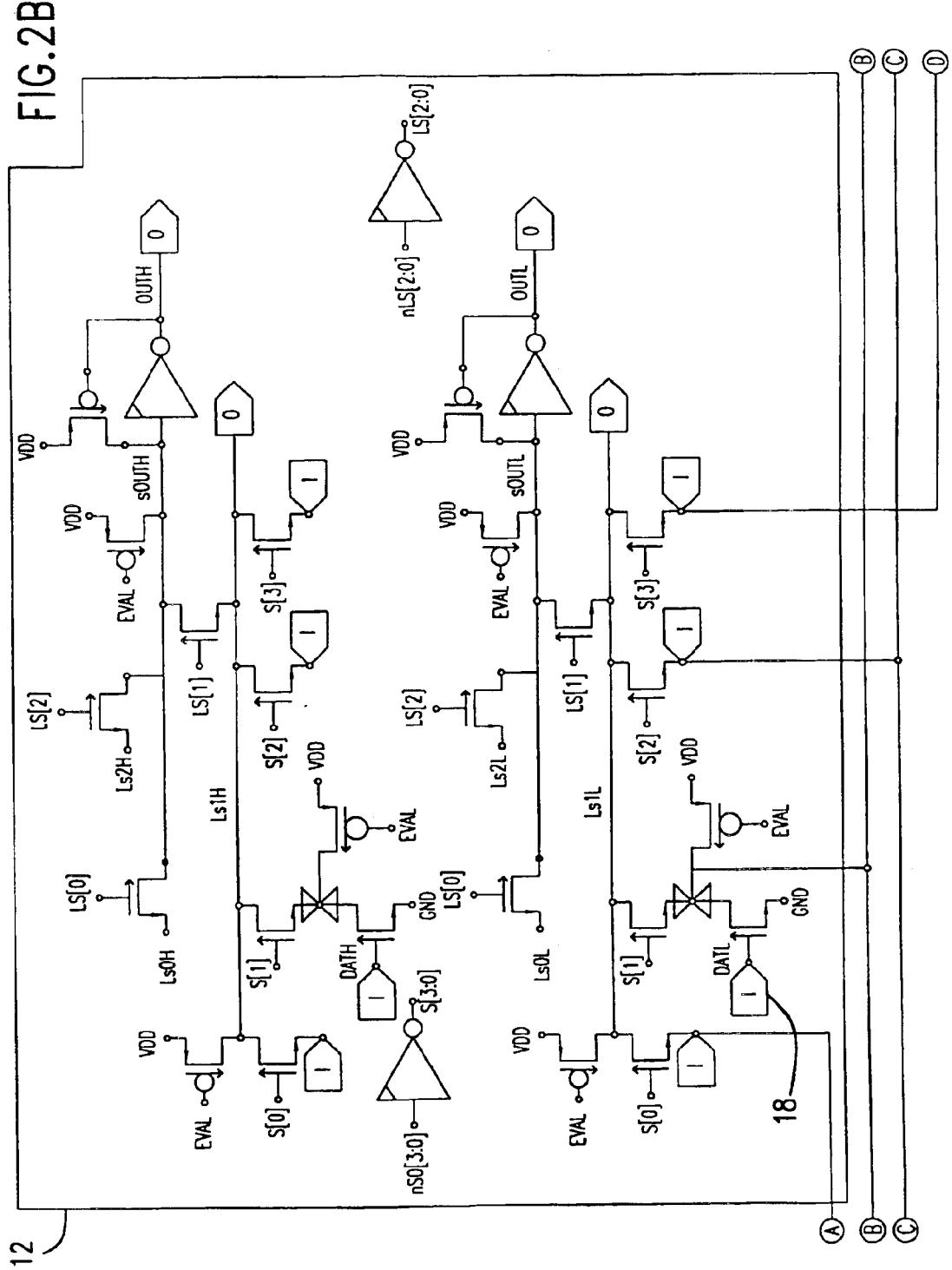
Figure 2C:
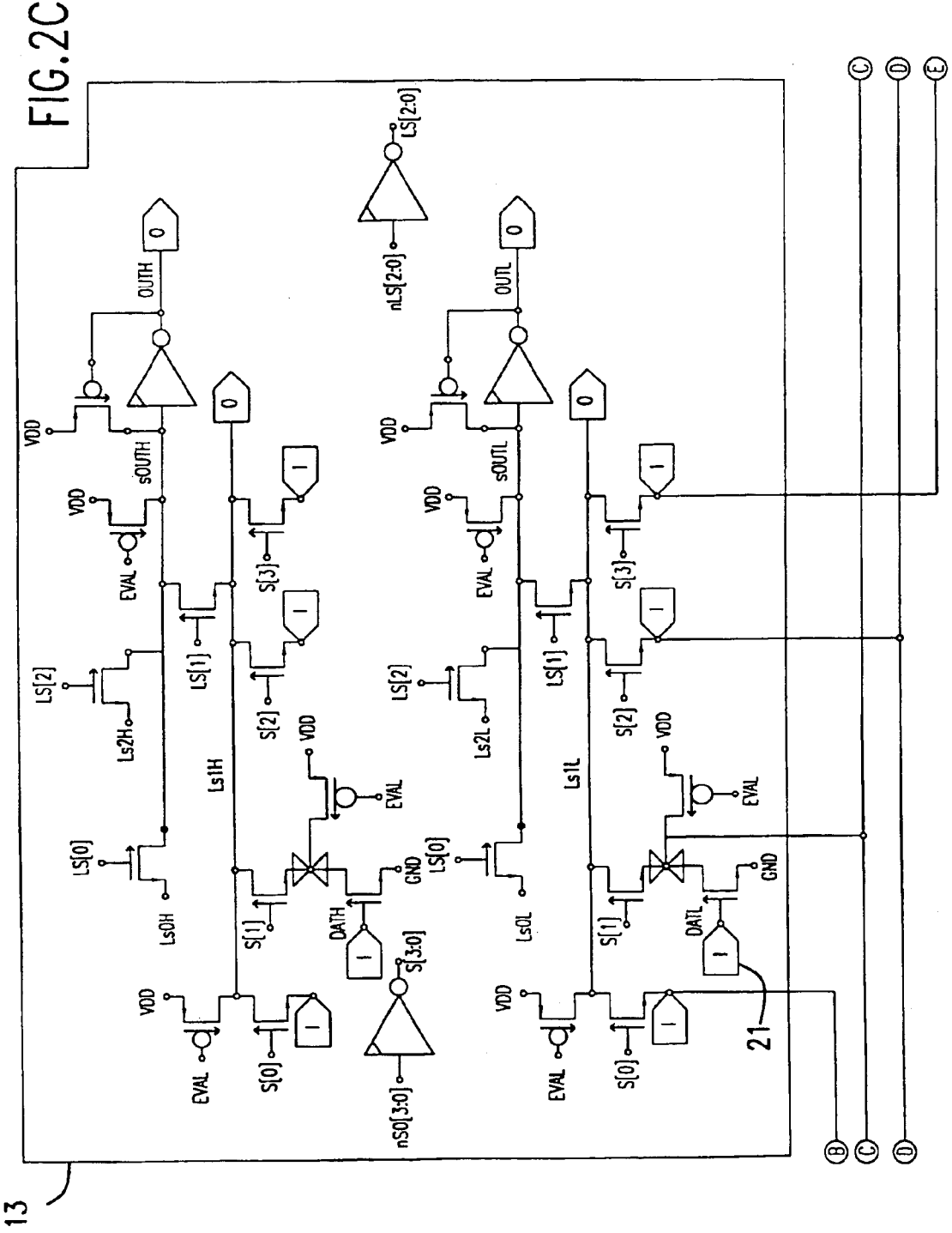
Figure 2D:
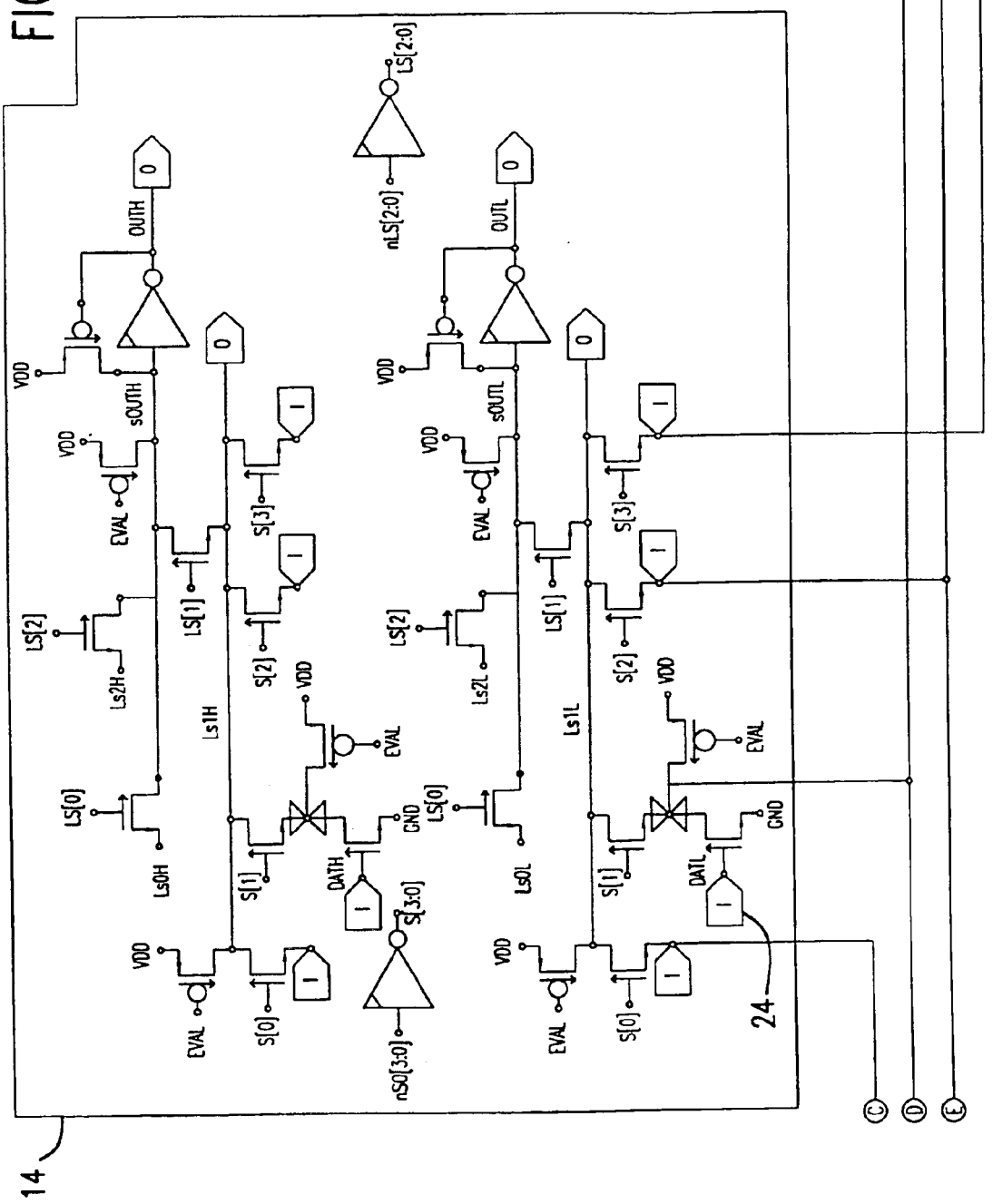

FIGS. 2A–2D are circuit diagrams illustrating an implementation of logic gates 11–14 and the data sharing among them. The following describes operation of logic gate 11, as shown in FIG. 2A, and the other logic gates 12–14 operate in a similar manner.

Logic gate 11 includes two stages of shifting as identified above. It receives a data input DATL on line 15 at transistor 40. Line 15 providing data DATL is a primary data line in that it is not received from another logic gate in logic circuit 10. Line 15 may provide data from a previous stage among, for example, the several stages that perform an FMAC operation. Logic gate 11 also receives data inputs on lines 61, 62, 63, and 64, and those lines provide for data sharing logic gate 11 with adjacent logic gates.

This data sharing is further illustrated among all logic gates 11–14 as shown in FIG. 1 and FIGS. 2A–2D. Line 61 provides for data sharing with the three left adjacent logic gates. Line 62 provides for data sharing with the two left adjacent and one right adjacent logic gates. Line 63 provides for data sharing with the one left adjacent and two right adjacent logic gates. Line 64 provides for data sharing with the three right adjacent logic gates.

The term "adjacent" refers to a logic gate processing a next bit among those collectively processed by a logic circuit. The next bit may include a bit in a direction of either the most significant bit position or the least significant bit position among the logic gates for a bus. Adjacent gates also may include one or more gates processing one or more next bits. For example, logic gates 11 and 12 are the two left adjacent logic gates to logic gate 13, and logic gate 14 is the one right adjacent logic gate to logic gate 13.

Referring back to FIG. 2A, the data sharing on lines 61–64 provides for the elimination of additional transistors. In particular, if logic gate 11 did not have data sharing, it would typically require an additional transistor for each of the data inputs on lines 61–64. Those transistors, if used, would interface the individual data lines with logic gate 11 in the same manner as transistor 40 interfacing data line 15 with logic gate 11. Elimination of those transistors results in a savings of area and power consumption.

The first stage of shifting is determined by shift control signals S[0], S[1], S[2], and S[3]. The first stage shift control signals are input to, respectively, transistors 43, 44, 45, and 46. The result of the first stage of shifting is output as signal Ls1L on line 50 and at tab 51, included for illustrative purposes only to illustrate the first stage output. The operation of logic gate 11 through the two stages of shifting is enabled when the EVAL clocking signal controlling transistors 39, 41, and 42 is high.

Table 1 identifies the physical result of shifting in the first stage based upon the values of the first stage shift control signals. The physical result identifies in which direction, if any, a data bit is shifted among the logic gates, and the physical result may differ from the logical result depending upon a particular implementation.

TABLE 1

| Value of first stage shift control signals | | | | |
|---|---|---|---|---|
| S[0] | S[1] | S[2] | S[3] | Physical result |
| 1 | 0 | 0 | 0 | one right shift |
| 0 | 1 | 0 | 0 | no shift |
| 0 | 0 | 1 | 0 | one left shift |
| 0 | 0 | 0 | 1 | two left shifts |

The first stage shift control signals S[0]–S[3] are active when high. With control signal S[0] asserted high, transistor 43 turns on and feeds a bit from line 61 to line 50. Since line 61 is connected with the left adjacent logic gate, the result is one physical right shift as a bit from the left adjacent logic gate is fed into gate 11. With control signal S[1] asserted high, transistor 44 turns on and feeds the data bit DATL to line 50. This involves no shifting since the data input into logic gate 11 is fed directly to line 50 and data from one of the shared lines is not fed to line 50. With control signal S[2] asserted high, transistor 45 turns on and feeds a bit from line 63 to line 50. This results in one physical left shift, as line 63 is connected with the data output from the right adjacent logic gate, in particular data signal 18 from logic gate 12. With control signal S[3] asserted high, transistor 46 turns on and feeds a bit from line 64 to line 50. This results in two physical left shifts; in particular, data signal 21 from logic gate 13 is fed on shared line 64 to line 50. This results in data shifting left two positions (two left shifts) from logic gate 13 to logic gate 11.

The second stage of shifting is controlled by shift control signals LS[0], LS[1], and LS[2]. The second stage shift control signals LS[0]–LS[2] control, respectively, transistors 47, 48, and 49. The logic gates 11–14 in this example are interconnected such that the output Ls1L of the first stage on line 50 is connected with the adjacent logic gates. In particular, input Ls0L on line 52 receives the Ls1L output from the left adjacent logic gate having the same configuration and operation as logic gate 11. Input Ls2L on line 53 receives the Ls1L output from the right adjacent logic gate 12. The second stage of shifting thus also uses shared data lines Ls1L from adjacent logic gates connected with the Ls0L and Ls2L inputs.

Table 2 identifies the physical result of shifting based upon the values of the second stage shift control signals. The physical result identifies in which direction, if any, a data bit is shifted among the logic gates, and the physical result may differ from the logical result depending upon a particular implementation.

TABLE 2

| Value of second stage shift control signals | | | |
|---|---|---|---|
| LS[0] | LS[1] | LS[2] | Physical result |
| 1 | 0 | 0 | one right shift |
| 0 | 1 | 0 | no shift |
| 0 | 0 | 1 | one left shift |

The second stage shift control signals LS[0]–LS[2] are active when high. With control signal LS[0] asserted high, transistor 47 turns on and feeds a bit from line 52 to line 54. Since line 52 receives the Ls1L output from the left adjacent logic gate, a bit from the left adjacent logic gate is shifted right into logic gate 11 and output on line 54. With control signal LS[1] asserted high, transistor 48 turns on and feeds a bit on line 50 through to line 54 with no shifting. With control signal LS[2] asserted high, transistor 49 turns on and feeds a bit from line 53 to line 54. Since line 53 receives the Ls1L output from the right adjacent logic gate 12, a bit from the right adjacent logic gate 12 is shifted left into logic gate 11 and output on line 54.

As shown, the output of logic gate 11 in this example involves complementary outputs 53 and 54 separated by invertor 55. Feedback transistor 56 helps to control the state of a bit at line 54. In particular, with an output low on line 53, transistor 56 turns on and pulls line 54 high. With an output low on line 53, transistor 56 turns off and the state of line 54 remains low.

Since this exemplary implementation uses dual rail Domino CMOS logic, a logic circuit 60 is provided for the high side outputs, OUTH and its complement, sOUTH. These complementary outputs on the high side operate in a manner known in the art. Lines 53 and 54 provide the low side outputs, OUTL and its complement, sOUTL. The four outputs in this example correspond with shifted data output 16. The data shifts output as shifted data 16 are described with respect to how the data physically shifts among the logic gates, and the corresponding logical shifts may be different depending upon a particular implementation.

In addition, generation of the shift control signals may depend upon a particular implementation as well. Those signals are generated by other circuitry depending upon the particular implementation. For example, an implementation performing an FMAC operation typically uses a circuit known as a leading bit anticipator to generate the control signals. Other implementations are possible and, although dual rail Domino CMOS logic is shown, other types of logic gates and transistors may implement data sharing consistent with the present invention.

Invertors 57 and 58 are provided to illustrate the inversion of the control signals for transmission to the logic gates. In this example, the shift control signals S[0]–S[3] are inverted, transmitted to logic gate 11, and re-inverted by invertor 57 for controlling the first shift stage in logic gate 11. Likewise, the shift control signals LS[0]–LS[2] are inverted, transmitted to logic gate 1, and re-inverted by invertor 58 for controlling the second shift stage in logic gate 11. The inversion of the control signals to a low state is provided for better noise immunity during transmission to the logic gate, and other types of control signal transmission techniques may be used.

Accordingly, use of data sharing consistent with the present invention provides for the elimination of transistors within each logic gate and a savings in area and power consumption on an integrated circuit chip implementing the logic gates. Although two stages of shifting have been shown, different numbers of stages may be used. The number of stages and use of a multiplexer using logic circuit 10 may depend upon a particular application, and performing an FMAC operation is only one such example.

Also, different types of shifting may be implemented depending upon how the data sharing is implemented among adjacent logic gates. The connections of the data sharing lines determine at least in part how the data is shifted. As shown above, a logic gate can receive a shared data line providing a data input from one or two adjacent logic gates to providing one or two shifts of the data. If a logic gate is connected to more or fewer adjacent logic gates through the shared data lines, it can produce more or fewer data shifts. Also, based upon how the data sharing lines are connected the logic gates can be configured to perform varying shifts in different directions, such as one right shift and two left shifts as shown above. Although four data sharing lines are shown, more or fewer data sharing lines can be used depending upon a particular implementation, each data sharing line being coupled to a transistor receiving a control signal for feeding of data into the corresponding logic gate.

While the present invention has been described in connection with an exemplary embodiment, it will be understood that many modifications will be readily apparent to those skilled in the art, and this application is intended to cover any adaptations or variations thereof. For example, different types of data shifting, transistors, control signals, and labels for the signals may be used without departing from the scope of the invention. This invention should be limited only by the claims and equivalents thereof.

What is claimed is:

1. A logic circuit for use in a multiplexer to shift data, comprising:

a plurality of dual Domino complementary metal oxide semiconductor (CMOS) logic gates each logic gate receiving data inputs and control signals, wherein each data input line is connected only to a single data field effect transistor (FET), and wherein the control signals include a plurality of control lines to provide for multiple shifting operations; and a plurality of shared data lines connecting the logic gates, the shared data lines providing a portion of the data inputs for each of the logic gates by connecting data inputs among the plurality of logic gates;

wherein the logic gates shift data received at the data inputs based upon the control signals and the connections of the shared data lines to produce a shifted data output, and wherein all of the plurality of logic gates share a single data transistor for each data input, and wherein each of the logic gates receives one data input using the single data transistor and receives other data inputs from adjacent logic gates using the plurality of shared data lines to reduce the number of data transistors required wherein each of the logic gates provides complementary outputs as the shifted data output.

2. The logic circuit of claim 1 wherein each of the logic gates includes first and second stages of shifting performing first and second shift operations.

3. The logic circuit of claim 2 wherein each of the logic gates includes control inputs for receiving two sets of shift control signals for the first and second stages of shifting.

4. The logic circuit of claim 3, further including another plurality of shared data lines for providing data inputs to the second stage of shifting for the second shift operation.

5. The logic circuit of claim 1 wherein each of the logic gates receives as one of the data inputs a primary data line.

6. The logic circuit of claim 1 wherein each of the logic gates receives a clocking signal for enabling the logic gates to feed data.

7. The logic circuit of claim 1 wherein each of the logic gates includes a plurality of transistors, controlled by the control signals, for feeding data from the shared data lines into the logic gate.

8. The logic circuit of claim 1 wherein each of the shared data lines connects one of the logic gates with a plurality of the logic gates.

9. A method of using a multiplexer to shift data, comprising:

providing a plurality of dual rail Domino complementary metal oxide semiconductor (CMOS) logic gates each receiving data inputs and control signals, wherein each data input line is connected only to a single data transistor, and wherein the control signals include a plurality of control lines to provide for multiple shifting operations;

connecting the logic gates using a plurality of shared data lines, wherein the plurality of shared data lines providing a portion of the data inputs for each of the logic gates by connecting data inputs among the plurality of logic gates; and shifting data received at the data inputs by one or more data bits based upon the control signals and the connections of the shared data lines to produce a shifted data output, wherein all of the plurality of logic gates share a single data transistor for each data input, and wherein each of the logic gates receives one data input using the single data transistor and receives other data inputs from adjacent logic gates using the plurality of shared data lines to reduce the number of data transistors required.

10. The method of claim 9 wherein the shifting step includes shifting the data through first and second stages of shifting performing first and second shift operations.

11. The method of claim 10 wherein the providing step includes receiving two sets of shift control signals for the first and second stages of shifting.

12. The method of claim 11, further including connecting the logic gates using another plurality of shared data lines for providing data inputs to the second stage of shifting for the second shift operation.

13. The method of claim 9 wherein the providing step includes receiving as one of the data inputs a primary data line.

14. The method of claim 9 wherein the providing step includes receiving a clocking signal for enabling the logic gates to feed data.

15. The method of claim 9 wherein the shifting step includes feeding data to the logic gates using transistors controlled by the control signals.

16. The method of claim 9 wherein the connecting step includes connecting one of the logic gates with a plurality of the logic gates.

* * * * *

UNITED STATES PATENT AND TRADEMARK OFFICE
CERTIFICATE OF CORRECTION

PATENT NO. : 6,895,420 B1  
APPLICATION NO. : 09/505382  
DATED : May 17, 2005  
INVENTOR(S) : Roy R. Faget Page 1 of 1

It is certified that error appears in the above-identified patent and that said Letters Patent is hereby corrected as shown below:

IN THE CLAIMS

Claim 1, Column 6, line 19, after "dual" insert --rail--

Claim 9, Column 7, line 2, delete "transistor" and insert therefor --field effect transistor (FET)--

Claim 9, Column 7, line 19, after "data transistors required" insert --wherein each of the logic gates provides complementary outputs as the shifted data output--

Claim 15, Column 8, line 16, delete "data to" and insert therefor --data from the shared data lines into--

Signed and Sealed this

Twentieth Day of May, 2008

JON W. DUDAS  
*Director of the United States Patent and Trademark Office*